US008244038B2

(12) United States Patent
Fan et al.

(10) Patent No.: US 8,244,038 B2
(45) Date of Patent: Aug. 14, 2012

(54) TEXT VECTORIZATION USING OCR AND STROKE STRUCTURE MODELING

(75) Inventors: Zhigang Fan, Webster, NY (US); Francis K. Tse, Rochester, NY (US); Bingfeng Zhou, Beijing (CN); Yadong Mu, Beijing (CN); Tao He, Beijing (CN)

(73) Assignee: Xerox Corporation, Norwalk, CT (US)

( * ) Notice: Subject to any disclaimer, the term of this patent is extended or adjusted under 35 U.S.C. 154(b) by 915 days.

(21) Appl. No.: 12/332,913

(22) Filed: Dec. 11, 2008

(65) Prior Publication Data
US 2010/0150445 A1 Jun. 17, 2010

(51) Int. Cl.
*G06K 9/18* (2006.01)
(52) U.S. Cl. ........................................ 382/182
(58) Field of Classification Search .......... 382/181, 382/182, 185, 197
See application file for complete search history.

(56) References Cited

U.S. PATENT DOCUMENTS
7,561,739 B2* 7/2009 Xu et al. ............... 382/186

OTHER PUBLICATIONS

Cho-Huak Teh et al., "On the Detection of Dominant Points on Digital Curves" IEEE Transactions on Pattern Analysis and Machine Intelligence, vol. 11, No. 8, Aug. 1989, pp. 859-872.
Cho-Huak Teh et al., "A Scale-Independent Dominant Point Detection Algorithm" 1988 IEEE Int. Conference on CVPR, Jun. 5-9, Ann Arbor, Michigan, pp. 229-234.

* cited by examiner

*Primary Examiner* — Daniel Mariam
(74) *Attorney, Agent, or Firm* — Fay Sharpe LLP

(57) ABSTRACT

Systems and methods are described that facilitate dominant point detection for text in a scanned document. The dominant points are classified as "major" (e.g., structural) and "minor" (e.g., serif). A set of rules or parameters for each character is determined off-line. During the text vectorization, OCR is performed and the rules (parameters) associated with the recognized character are selected. Both major and minor dominant points are detected as a maximization process with the parameter set. For minor dominant points, additional processes are optionally employed.

14 Claims, 7 Drawing Sheets

TEXT VECTORIZATION USING OCR AND STROKE STRUCTURE MODELING

BACKGROUND

The subject application relates to vectorization of text in a scanned document. While the systems and methods described herein relate to vectorization of text characters in a scanned document, it will be appreciated that the described techniques may find application in other image classification systems, other xerographic applications, and/or other document analysis systems.

The shapes of text characters can usually be represented in bitmap or outline (vector) forms. In the latter representation, a character is specified with a set of curves describing its outlines, which has the advantage of resolution independency. Outline (vector) fonts exist extensively in electronically created files. However, they are not native for scanned documents. In scanned document images, the text are obtained as bitmaps.

Vectorization of text specifies text characters with sets of curves. Compared with a more traditional bitmap, vectorization of text in scanned document generates a resolution independent representation. It has the advantages of: 1) smooth text instead of a jagged and bumpy bitmap; 2) better image quality for scaling and/or printing on different output resolution devices (desirable for multi-functional devices and important for mobile devices); and 3) shape of the text can be edited using standard graphic tools such as Adobe Illustrator, which enables easy modification of font attributes (size, boldness, etc.) for repurposes.

Typically, text in a scanned document is stored as a bitmap with binary values (e.g., 0 and 1) corresponding to a white or black pixel color value, Vector representation is used to for electronically generated text because it is resolution independent, whereas a bitmap is not. Additionally, vector representations are more easily manipulated (e.g., bolded, etc.) than bitmaps.

To achieve high quality text vectorization, dominant point detection is a critical step. Conventional algorithms were originally designed for graphical objects with high signal to noise ratio, and are not accurate for text, particularly small text, which has a low signal to noise ratio.

Accordingly, there is an unmet need for systems and/or methods that facilitate dominant point detection and vectorization while overcoming the aforementioned deficiencies.

BRIEF DESCRIPTION

In accordance with various aspects described herein, systems and methods are described that facilitate vectorization on text character bitmaps. For example, a method of vectorization on text characters in a scanned document comprises executing an optical character recognition (OCR) algorithm that recognizes a text character in the scanned document, performing a table lookup that identifies one or more dominant point detection rules for detecting dominant points on the text character. The method further comprises applying the one or more identified dominant point detection rules to the text character to detect dominant points on the text character, fitting one or more curves to each text character outline between neighboring dominant points to convert the text character from a bitmap to a vector representation using the detected dominant points, and storing the vectorized text character to memory for use in a vector representation of the scanned document.

According to another feature described herein, a text vectorization system comprises a memory that stores computer-executable instructions for performing an optical character recognition (OCR) algorithm that recognizes a text character in the scanned document, and performing a table lookup of a rule database that identifies one or more rules for detecting dominant points on the text character. The instructions further include applying the one or more identified dominant point detection rules to the text character to detect dominant points on the text character, and fitting one or more curves to the text character using the detected dominant points, and storing a vectorized text character for use in a vector representation of the scanned document. Additionally, the system comprises a processor that executes the computer-executable instructions.

Yet another feature relates to an apparatus for vectorization of text characters in a scanned document comprises means for executing an optical character recognition (OCR) algorithm that recognizes a text character in the scanned document, and means for performing a table lookup that identifies one or more rules for detecting dominant points on the text character, means for applying the one or more identified rules to detect the dominant points, means for fitting curves to the text character, and converting it from a bitmap to a vector representation using the detected dominant points, and means for storing the vectorized text character to memory for use in a vector representation of the scanned document.

DETAILED DESCRIPTION

In accordance with various features described herein, systems and methods are described that facilitate text vectorization. "Vectorization" refers to the process of converting raster graphics (e.g., a bitmap) into vector graphics. An important step in text vectorization is the detection of the dominant points (DP). The outline(s) of a vectorized character is (are) usually reconstructed with more than one curve, and the terminal points (starting and ending points) of the curve(s) are specified by the dominant points. The outline between neighboring dominant points is fit by one or more curve (typically $1^{st}$, $2^{nd}$, or $3^{rd}$ order polynomials). The described systems and methods facilitate dominant point detection as detection of extrema of a text character in different directions, such as a top-left point, a bottom right point, etc. The dominant points are classified as "major" (structural) and "minor" (serif). A set of rules (parameters) for each character is determined off-line. During the text vectorization, OCR is performed and the rules (parameters) associated with the recognized character are selected. Both major and minor dominant points are detected as a maximization process with the parameter set. For minor points, additional processes are optionally employed.

Figure 1:
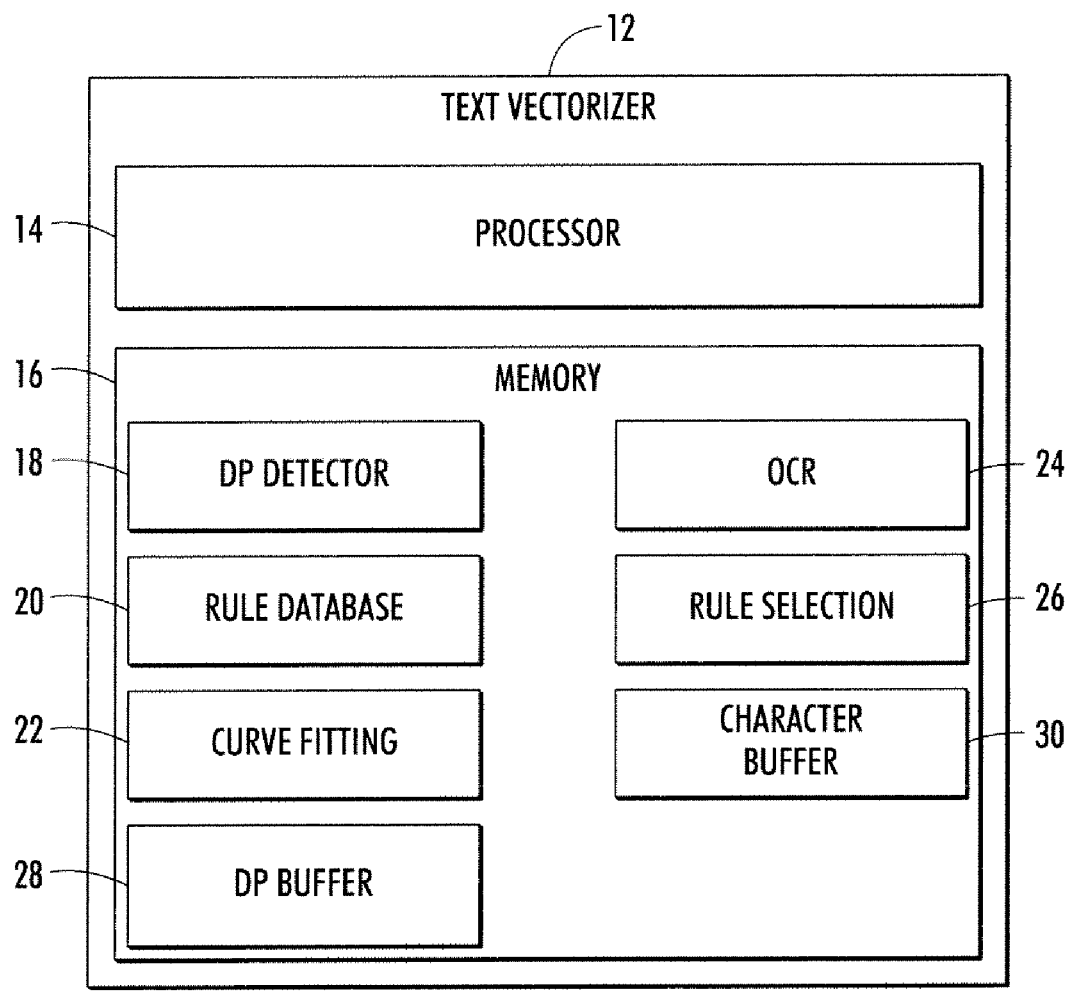
FIG. 1 illustrates a text vectorization system that comprises a DP detector with a processor that executes, and a memory that stores, computer executable instructions for detecting dominant points on text characters using an optical character recognition (OCR) process, in accordance with various aspects described herein.

With reference to FIG. 1, a text vectorization system 12 comprises a processor 14 that executes, and a memory 16 that stores, computer executable instructions for performing optical character recognition (OCR), detecting dominant points on text characters, and fitting curves to the characters in accordance with various aspects described herein.

Accordingly, the memory 16 includes a DP detector 18 (e.g., a computer-executable set of instructions or algorithm(s)) that, when invoked by the processor 14, accesses a rule database 20 that stores DP detection rules for a plurality of text characters (e.g., alphanumeric characters or the like) and applies selected rules to detecting dominant points during DP detection. Each rule includes information that tells the processor 14 how to detect dominant points, such as a region of a character's bitmap in which to look for a dominant point, a direction along which to proceed when looking for a dominant point, other detected dominant points and their locations on the character's bitmap, etc. Once DPs are determined, a curve fitting algorithm 22 is executed to fit a curve between neighboring dominant points in order to vectorize the text character.

The memory 16 further includes an OCR algorithm 24. The OCR algorithm 24 is executed to recognize text characters in a document. A rule selection algorithm 26 facilitates selecting appropriate rules for a given character (according to the OCR result), and a dominant points buffer 28 stores detected dominant points after their detection. A character buffer 30 stores information associated with text characters before, during, and after the various algorithms are executed thereon by the processor 14.

OCR results are used to guide dominant point detection. Specifically, OCR is performed before dominant point detection. The dominant points are located as extrema of the curves of a given text character when they are projected in certain directions. The parameters or rules used for extrema detection are predetermined offline for each character and stored to the rule database 20.

With regard to dominant point detection, a particular character's font glyphs may have different shapes, but they typically share same stroke structures. Additionally, dominant points can be classified into two types: a) the "major" dominant points that define starting, ending, and intersection points of the strokes; and b) the "minor" dominant points that specify the shapes of the strokes (e.g. serifs). In view of the foregoing assumptions, major dominant points are relatively stable (independent of fonts) and their detection can be significantly improved by exploiting OCR results. The dominant points are usually maximum and minimum points when the boundary is projected to a certain direction. The maximum and minimum (e.g., extrema) can be either global or local.

Figure 2A:
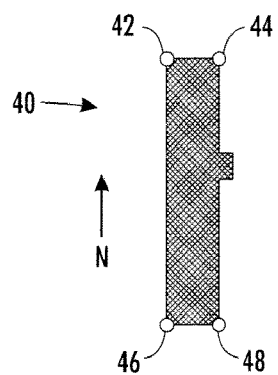
FIGS. 2A-C illustrate a text character (e.g., an "I") with a plurality of dominant points, in accordance with various aspects described herein.

With continued reference to FIG. 1, FIGS. 2A-C illustrate a text character 40 (e.g., an "I") with a plurality of dominant points, in accordance with various aspects described herein. The number and the positions of the points are important to the quality of vectorization, which is demonstrated in FIGS. 2A-C with a simple example with a san serif font "I". FIG. 2A illustrates an ideal DP detection, with four major dominant points 42, 44, 46, 48 at the four corners of the vertical stroke of the character 40.

Figure 2B:
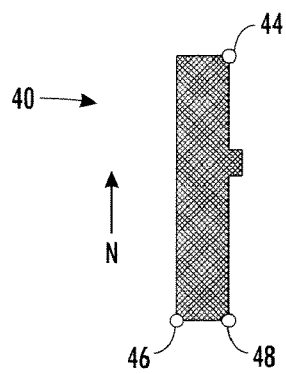
Figure 2C:
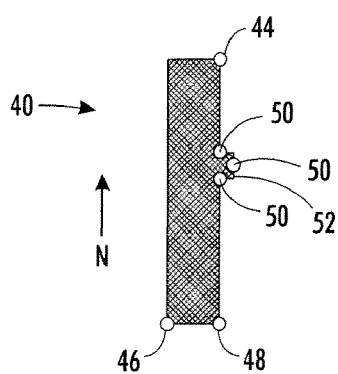

FIGS. 2B and 2C illustrate two kinds of errors that can occur using classical techniques: under-fitting and over-fitting. In FIG. 2B, the northwestern dominant point (point 42 in FIG. 2A) is missing. Since the outline between the dominant points 44 and 46 contains a corner and is difficult to fit using one smooth curve, a large fitting error can be expected when under-fitting occurs. In FIG. 2C, three extraneous dominant points 50 at the middle of the stroke fit the noise 52 (e.g., an artifact on the character 40 that may arise during scanning or the like).

Dominant points are traditionally selected at high curvature points on a character, such as the corners of the "I" in FIG. 2. To avoid over-fitting the noise or artifact 52 on the right side of the character 40, the smoothing algorithm 32 is applied to the detection neighborhood (e.g., a region in which DP detection is performed on a text character). The neighborhood size is selected by satisfying two conflicting requirements: the neighborhood should be large enough to permit the smoothing algorithm 32 to smooth out the noise, and yet small enough so that two closely-located high-curvature points are distinguishable. In this manner, text, which often exhibits a low signal to noise ratio and/or contains small details (particularly in serifs) that are comparable to noise in size, can be smoothed and vectorized.

Figure 3:
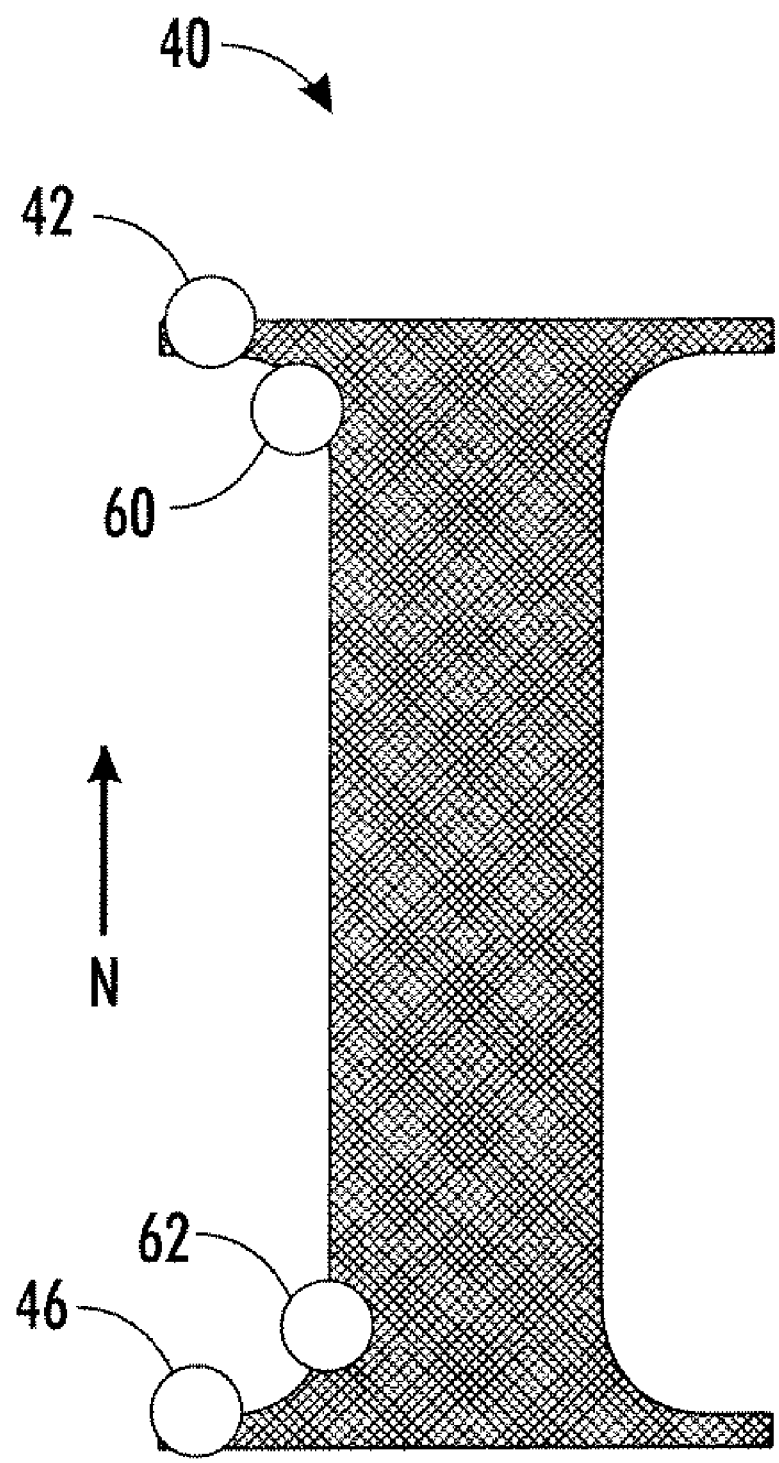
FIG. 3 illustrates another aspect of dominant point detection that is addressed by the systems and methods described herein.

FIG. 3 illustrates another aspect of dominant point detection that is addressed by the systems and methods described herein. Dominant points in text are sometimes not highly curved. For example, minor dominant points 60, 62 represented in FIG. 3 reside in a smooth varying outline, but are important for a quality vectorization. The minor dominant points 60, 62 partition the left outline into one vertical line and two small curves (one at top and one at bottom of the "I"). Without them, the outline between the dominant points 42, 46 would to be fitted by one curve.

Figure 4A:
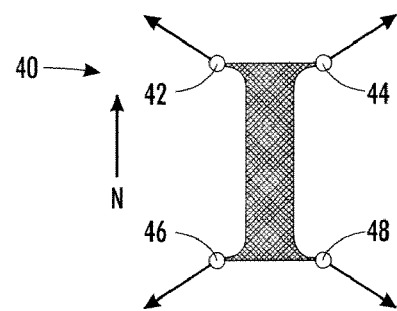
FIGS. 4A-C illustrate the text character (e.g., a glyph) in three different fonts, to which the vectorization algorithm is applied, in accordance with various aspects described herein.
Figure 4B:
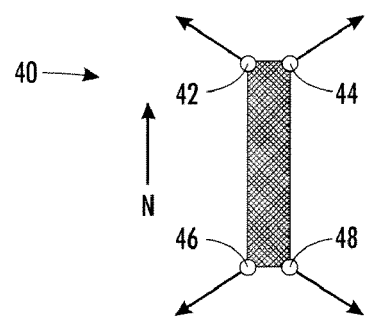
Figure 4C:
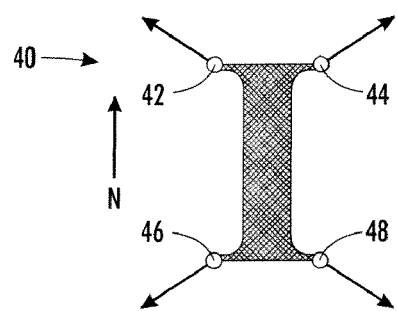

FIGS. 4A-C illustrate the text character 40 (e.g., a glyph) in three different fonts, to which the vectorization algorithm 22 (FIG. 1) is applied, in accordance with various aspects described herein. Although the fonts appear different, their stroke structures are similar: a vertical stroke. Four major dominant points 42, 44, 46, 48 can be obtained as the Northwest, Northeast, Southwest, and Southeast corners of the glyphs. Specifically, the major dominant points can be calculated as $$\arg \text{Max}_{(x,y)} x \cos t + y \sin t \qquad (1)$$

where the dominant point search is performed on all boundary points (x,y) of the glyph, t is a parameter or rule (e.g, stored in the rule database) that determines the projection direction, along which the processor 14 attempts to maximize equation (1). In this example, t is $3\pi/4$ (for the NW corner), $\pi/4$ (NE), $5\pi/4$ (SW), and $7\pi/4$ (SE) respectively (shown by the arrows in FIGS. 4-6).

Figure 5A:
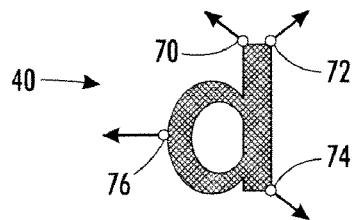
FIGS. 5A-D illustrate a more complex example wherein the text character or glyph is a letter "d", in accordance with various aspects described herein.
Figure 5B:
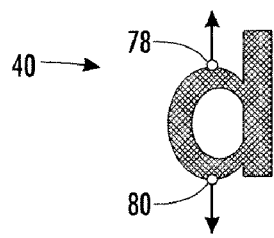
Figure 5C:
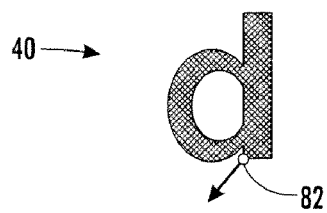

FIGS. 5A-C illustrate a more complex example wherein the text character 40 or glyph is a letter "d", in accordance with various aspects described herein. The major points are detected in several steps.

In FIG. 5A, four points 70, 72, 74, 76 are determined using formula (I) with parameter $t=3\pi/4$, $\pi/4$, $7\pi/4$, and $\pi$, respectively, where t represents the direction in which the dominant point detection proceeds, as indicated by the arrows extending from each dominant point. In another example, directional coordinates (e.g., N, S, E, W, NW, NE, SW, SE, NNE, ENE, SSE, ESE, and so on) are used to describe t. Each major dominant point represents a maximum or minimum on the text character, In FIG. 5B, dominant points 78, 80 are detected with $t=\pi/2$ and $3\pi/2$, respectively. An additional restriction or rule may be imposed during maximum searching for the dominant points 78, 80 on the letter "d", such that $x<W/2$ and $y>0.8$ H, where W and H are the width and height of the character 40, respectively, and where x and y are measured from the left and bottom of the character, respectively.

In FIG. 5C, dominant point 82 is obtained, in which $t=5\pi/4$. There is also an additional constraint or rule that point 82 be located "between" points 74 and 80, where "between" is defined as follows: If a boundary loop is chain-coded (e.g., in a clockwise direction) and each boundary point is assigned an index according to the coding sequence, then point "a" is between "b" and "c" if and only if:

$$Ic \geq Ia \geq Ib \text{ or } Ia \geq Ib \geq Ic \text{ or } Ib \geq Ic \geq Ia$$

where Ia, Ib, and Ic are the indices of points a, b, and c, respectively.

Figure 5D:
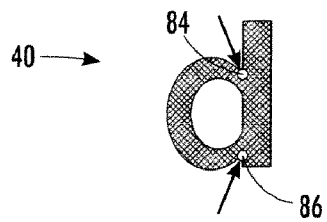

In FIG. 5D, two dominant points 84, 86 are determined. Unlike the previous dominant points, points 84 and 86 reside at the concave parts of the boundary. As a result, the maximization in equation (1) may be replaced by minimization. However, since minimization with direction t is equivalent to maximization with $t+\pi$, formula (1) can remain unchanged, but with a modified t. The directions are set to $\pi/3$ and $5\pi/3$, respectively. Point 84 is between points 70 and 78, and point 86 is between points 80 and 82.

The dominant points for the inner loop of the "d" can be located with $t=\pi/3, \pi/2, 3\pi/2$ and $5\pi/3$.

Some letters may require more than one set of rules, and the processor 14 executes the rule selection algorithm 26 to select the one that best fit to the data as the final result. Additional rules apply for italic letters.

Figure 6A:
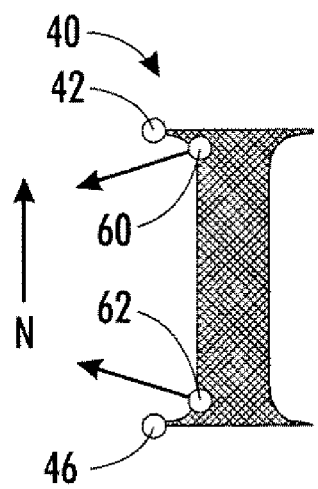
FIGS. 6A-B illustrate the character during minor dominant point detection, in accordance with various aspects described herein.
Figure 6B:
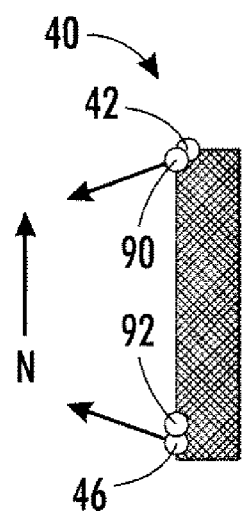

FIGS. 6A-B illustrate the character 40 during minor dominant point detection, in accordance with various aspects described herein. The character 40 in this example is the letter "I". Once the major dominant points are determined, the minor dominant points can be located in a similar manner. For example, the left two minor dominant points 60, 62 of the "Times New Roman" "I" in FIG. 6A can be determined by searching using equation (1) between the two left major points 42, 46, with $t=13\pi/12$ and $11\pi/12$, respectively. This detects the points where the serifs join the vertical stroke of the character or glyph.

However, there is a difference between the minor and major points. The minor points 60, 62 often exhibit greater variations across different fonts, which results in two consequences. First, there is an increase in the number of models for a character that varies widely across fonts, and the minor dominant points are determined using multiple sets of rules. The processor 14 selects the rule or set of rules that provides the best data fitting. Second, "degeneration" can occur when one model is shared for both serif and san serif fonts, as illustrated in FIG. 6B. The san serif font "I" does not contain any minor dominant points. If the same rule used for serif font is applied ($t=13\pi/12$ and $11\pi/12$), two artificial minor points 90, 92 may be detected at the same location as the major critical points (or their vicinity). Typically, the detected points in the degeneration are located at the boundary of the detection range and are identified and deleted by the processor 14.

When an error arises due to the OCR algorithm, the dominant points detected may be affected, resulting in poor data fitting. In one embodiment, a greater than expected data fitting error is used as a fault indicator, and the system reverts to a conventional vectorization method.

Since OCR is performed in multifunction devices and scanning services for other (non-vectorization) reasons (e.g., making a document searchable, metadata extraction, form recognition, categorization, etc.), using OCR for text vectorization does not introduce extra computation costs.

In this manner, a set of rules or parameters that include t and constraints ($x1 \geq x \geq x0, y1 \geq y \geq y0, I1 \geq I \geq I0$) are determined for each character off-line. During the text vectorization, OCR is performed and the rules associated with the recognized character are selected. Both major and minor dominant points are detected as a maximization process with the rule set. For minor points, more sets of parameters may be employed and additional processing may be performed to detect degenerated cases and delete artificial minor dominant points.

Figure 7:
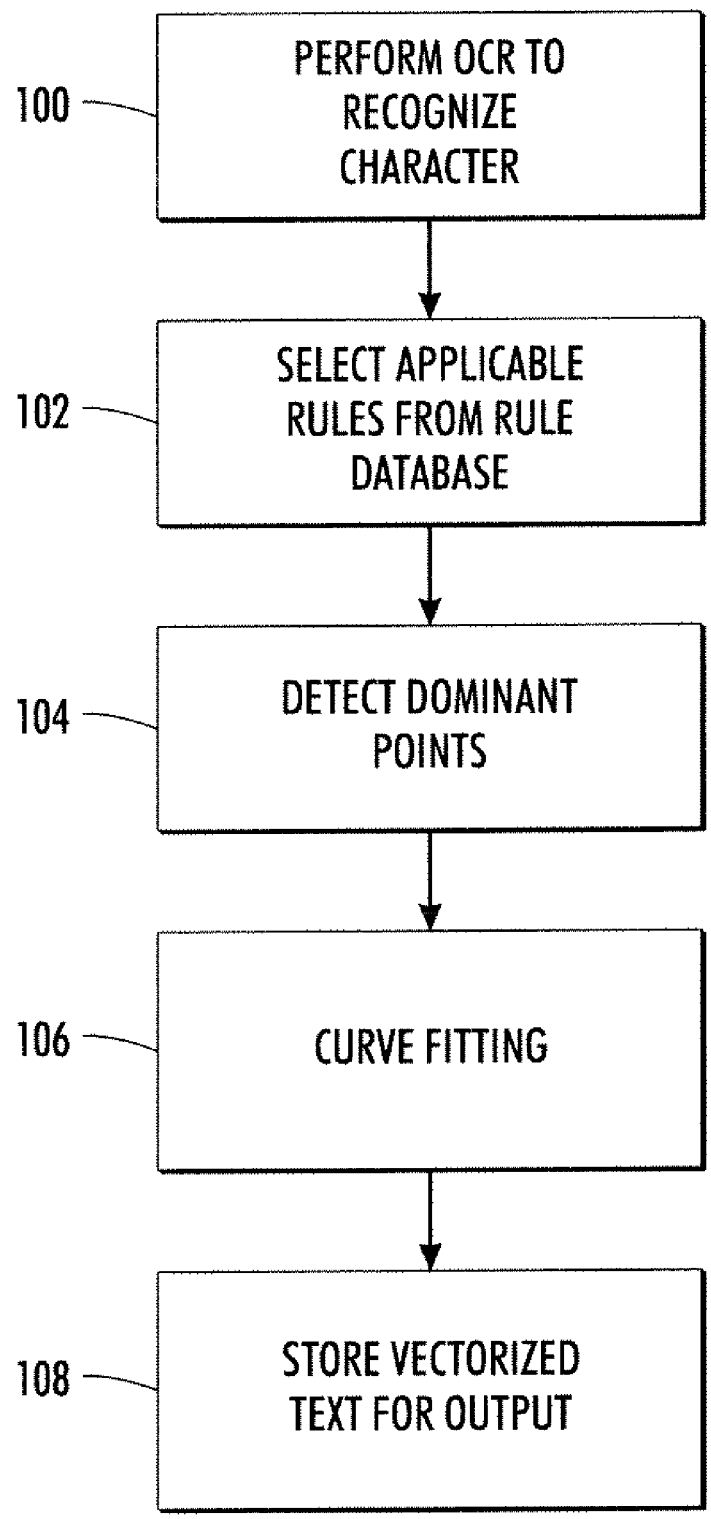
FIG. 7 illustrates a method of vectorizing text using dominant point detection, in accordance with various aspects set forth herein.

FIG. 7 illustrates a method of vectorizing text using dominant point detection, in accordance with various aspects set forth herein. At 100, an OCR algorithm is executed on a scanned document or page to identify text characters therein. For each identified character, a dominant point detection rule or rule set is identified and retrieved (e.g., via a table lookup of a lookup table in a rule database or the like) for application to the character, at 102. At 104, dominant points on the character are determined. Optionally, artificial dominant points are detected and deleted. At 106, a curve fitting algorithm is executed, which fits curves to the outlines of the characters between the neighboring dominant points. The curve fitting can be performed by any known methods such as least square or the like. The curves to be used are typically $1^{st}$, $2^{nd}$, or $3^{rd}$ order polynomials or arcs. At 108, the vectorized text character is stored for output or use in a refined version of the scanned document. The method then reverts to 102 for further iteration on subsequent text characters.

It will be appreciated that various of the above-disclosed and other features and functions, or alternatives thereof, may be desirably combined into many other different systems or applications, Also that various presently unforeseen or unanticipated alternatives, modifications, variations or improvements therein may be subsequently made by those skilled in the art which are also intended to be encompassed by the following claims.

The invnetion claimed is:

1. A method of detecting dominant points on text characters in a scanned document, comprising:
   executing an optical character recognition (OCR) algorithm that recognizes a text character in the scanned document;
   performing a table lookup that identifies one or more dominant point detection rules for detecting the dominant points;
   applying the one or more identified dominant point detection rules to the text character to detect dominant points on the text character;
   fitting one or more curves to each text character outline between neighboring dominant points to convert the text character from a bitmap to a vector representation using the detected dominant points; and
   storing the vectorized text character to memory for use in a vector representation of the scanned document.

2. The method of claim 1, further comprising classifying each detected dominant point as at least one of a major dominant point, a minor dominant point, and an artificial dominant point.

3. The method of claim 2, further comprising removing artificial dominant points from further processing.

4. The method of claim 1, wherein the dominant point is a maximum or minimum of the text character in a pre-specified direction.

5. The method of claim 1, wherein each dominant point is calculated as:

$$\arg \operatorname{Max}_{(x,y)} x \cos t + y \sin t \qquad (1)$$

where the dominant point is searched for on all boundary points (x,y) of the text character, t is a parameter in the one or more identified vectorization rules that determines the projection direction of the search for the dominant point.

6. The method of claim 5, wherein t is specific to each of the one or more identified dominant point detection rules for each of a plurality of text characters.

7. The method of claim 1, wherein each dominant point detection rule for the text character includes information related to a region of the bitmap in which to search for the dominant point, a direction along which to proceed when searching for the dominant point, and other detected dominant points and their locations on the bitmap.

8. A vectorization system for scanned document, comprising:
   a memory that stores computer-executable instructions for:
      performing an optical character recognition (OCR) algorithm that detects a text character in the scanned document;
      performing a table lookup of a rule database that identifies one or more dominant point detection rules for detecting dominant pointr;
      applying the one or more identified dominant point detection rules to the text character to detect dominant points on the text character;
      fitting one or more curves to each text character outline between neighboring dominant points using the detected dominant points; and
   storing a vectorized text character for use in a vector representation of the scanned document; and a processor that executes the computer-executable instructions.

9. The system of claim 8, the instructions further comprising classifying each detected dominant point as at least one of a major dominant point, a minor dominant point, and an artificial dominant point.

10. The system of claim 9, the instructions further comprising removing artificial dominant points from further processing.

11. The system of claim 8, wherein the dominant point is a maximum or minimum of the text character for a certain direction.

12. The system of claim 8, wherein the processor calculates each dominant point as:

$$\arg \operatorname{Max}_{(x,y)} x \cos t + y \sin t \qquad (1)$$

where the dominant point is searched for on all boundary points (x,y) of the text character, t is a parameter in the one or more identified vectorization rules that determines the projection direction of the search for the dominant point.

13. The system of claim 12, wherein t is specific to each of the one or more identified dominant point detection rules for each of a plurality of text characters.

14. An apparatus for vectorization on text characters in a scanned document, comprising:
   means for executing an optical character recognition (OCR) algorithm that recognizes a text character in the scanned document;
   means for performing a table lookup that identifies one or more dominant point detection rules for detecting dominant points;
   means for applying the one or more identified dominant point detection rules to the text character to detect major and minor dominant points on the text character;
   means for fitting one or more curves to each text character outline between neighboring dominant points using the detected dominant points; and
   means for storing the vectorized text character to memory for use in a vector representation of the scanned document.

* * * * *